United States Patent Office 2,956,001
Patented Oct. 11, 1960

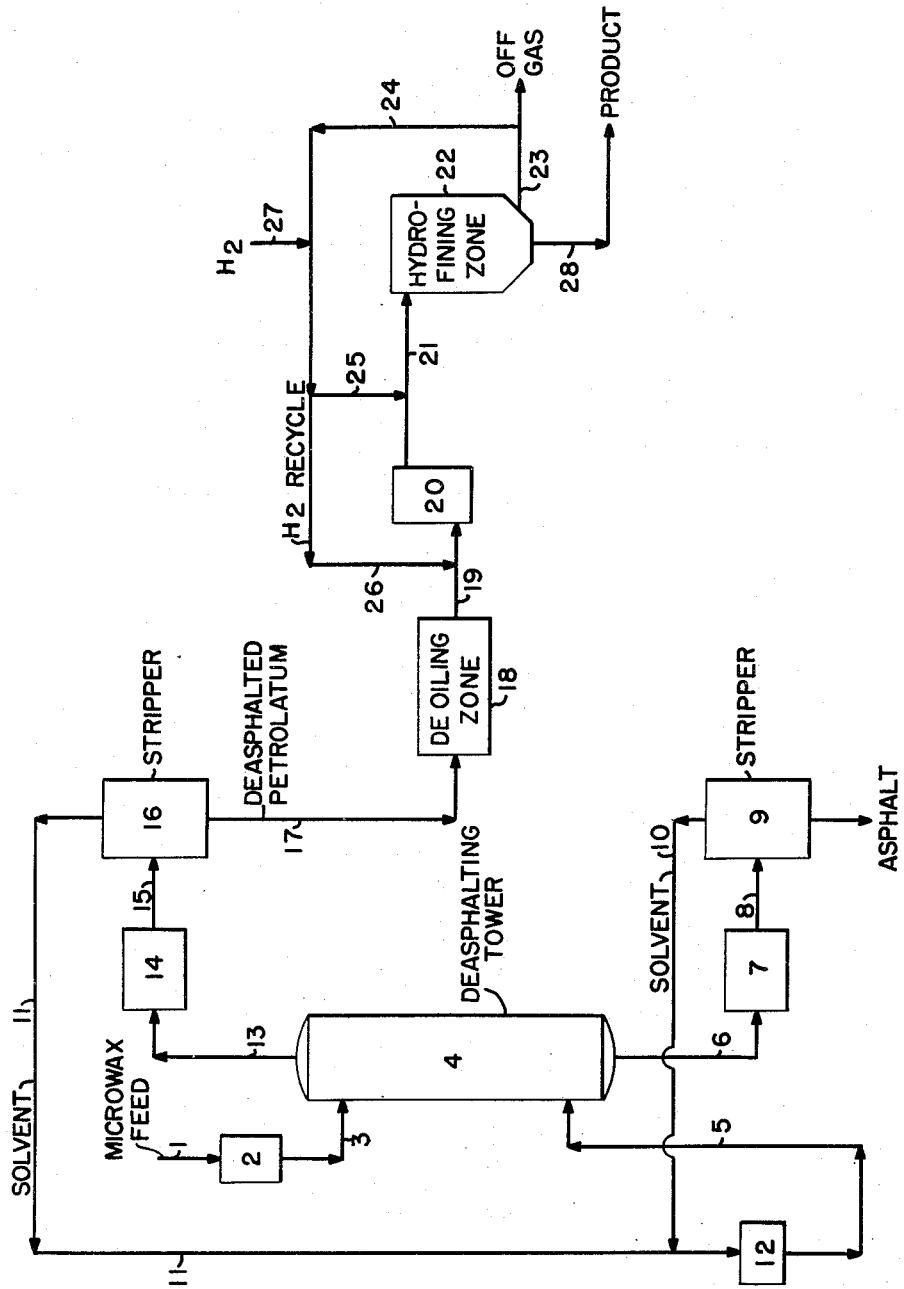
Byron Spars
Herman J. Zoeller
Burton J. Sutker
Inventors
By *H. M. Feyrer*  Attorney

2,956,001
REFINING OF MICROCRYSTALLINE WAX

Byron Spars, Elizabeth, Herman J. Zoeller, Union, and Burton J. Sutker, Newark, N.J., assignors to Esso Research and Engineering Company, a corporation of Delaware Filed Dec. 3, 1958, Ser. No. 777,958

14 Claims. (Cl. 208—27)

The present invention is concerned with a method of refining hydrocarbon waxes that are derived from petroleum. More specifically, the invention is concerned with a method of manufacturing high molecular weight wax products which are characterized by excellent color, odor and stability.

The present invention is concerned with high molecular weight wax recovered from residual crude oil fractions boiling above about 1000° F. which are known as microcrystalline waxes. These microwaxes account for approximately 14% of the domestic wax market. These waxes are used in the manufacture of many products, including food containers, waxed paper, and other miscellaneous products such as explosives, matches and certain electrical devices.

Prior to the present invention, the most generally accepted commercial procedure for refining a residual petroleum-type wax has consisted in subjecting the wax to a solvent deoiling step in order to reduce the oil content of the wax. The deoiled wax has been contacted with an adsorbent material such as bauxite, alumina, silica gel, clay, activated char or the like in order to reduce its carbonizable matter and to improve color stability, and other quality factors. One suggested variation in this procedure has been to employ a catalytic-type, hydrogen treating operation commonly referred to as hydrofining in place of the clay percolation step. It has been known for some time that hydrogen can react with oily, aromatic constituents within a wax to form new compounds which are noninjurious to the desired qualities of the wax. In other words, it has been known that the poor color, odor and stability characteristics of a hydrocarbon wax are occasioned very often by the presence of polycyclic aromatic oily compounds within the wax which are not completely removed during the dewaxing and/or deoiling steps. Indeed, these compounds are removed only with great difficulty in the presently conventional clay treating steps and it has been a general experience that it is extremely difficult to consistently obtain wax products having completely satisfactory color, odor and stability characteristics.

It has also been recognized for some time that the successful development of a procedure for refining deoiled, crude petroleum waxes with a hydrofining treatment would offer distinct commercial advantages in comparison with the clay treating procedure. To date, however, a really satisfactory wax treating process utilizing hydrogen has not been developed. In the first place, relatively mild, selective conditions must be used to avoid isomerization and cracking reactions which would convert some of the wax to oil. Secondly, at these mild conditions, the catalysts used in the past have not given as much improvement as desired. Thirdly, catalyst life with the more active catalysts has been too short to be of practical interest.

The object of the present invention is to provide the art with an improved method of refining residual microwax, wherein the waxes produced are characterized as possessing excellent color, odor and stability. It is also the object of this invention to provide an improved hydrofining process in which the catalyst is maintained at a high level of activity for a heretofore unattainable length of time.

These and other related objects are attained in accordance with the present invention by subjecting a microcrystalline wax petrolatum which has been recovered from crude oil boiling above about 1000° F. in a conventional dewaxing process to a deasphalting step followed by hydrofining the deasphalted petrolatum over a cobalt molybdate wax hydrofining catalyst. The petrolatum may then be deoiled to reduce the oil content to the required level or, if desired, deoiled after deasphalting the petrolatum and before hydrofining. By the relatively simple procedure of deasphalting a high oil content microwax petrolatum before hydrofining, it is now possible to produce, by hydrofining, a superior wax product and maintain the activity of the hydrofining catalyst for an indefinite period of time.

As mentioned earlier, the catalyst of the present invention consists chemically of cobalt oxide and molybdenum oxide possibly combined as cobalt molybdate on a solid absorbent carrier and can be purchased commercially. The carrier may be selected from the many materials such as adsorptive alumina, bauxite, silica gel, clay, hydrogen fluoride promoted alumina and the like, which are usually employed for this general purpose. A material which is particularly preferred as a carrier, however, is alumina. It is preferred that this catalyst contain about 2 to 5 wt. percent cobalt oxide and 8 to 15 wt. percent molybdenum oxide. About 3.6 wt. percent cobalt oxide and 12.5 wt. percent molybdenum oxide have been found to be especially effective.

The catalyst, as it is employed in the present invention, may be in the form of a fixed bed, a fluidized bed or a moving bed. It is contemplated that the process is best carried out by utilizing it in the form of a fixed bed. In this case it is desired that the catalyst have a particle size of from about $\frac{1}{16}''$ to $\frac{1}{2}''$ and preferably about $\frac{1}{16}''$ to $\frac{1}{4}''$. Particles of this nature may be prepared by conventional crushing, pilling and extruding processes or by other well known techniques. It has been found that a catalyst in the form of $\frac{1}{8}''$ diameter by $\frac{1}{8}''$ long pills and $\frac{1}{8}''$ extrudates affords particularly satisfactory operation.

The feed for the present invention is commonly referred to as soft microwax petrolatum. This feed is a black to brown colored, gelatinous, oily, translucent, semi-solid, amorphous mass whose consistency varies with the temperature. It is obtained by dewaxing a residual crude oil fraction boiling above about 1000° F. In simplest terms, it is a microwax obtained from a dewaxing operation which has not been deoiled and therefore contains from about 10 to 50 wt. percent oil, preferably 20 to 25 wt. percent oil.

Before entering into a more detailed description of the present invention, it is well to have in mind the procedures that are usually employed for evaluating a hydrocarbon wax insofar as its color, odor, stability and carbonizable matter content are concerned. Thus, the color of a wax is generally evaluated by either the Saybolt or Tag-Robinson method of color determination both of which are standard tests in the petroleum industry. Descriptions of these methods can be found in the "New and Revised Tag Manual for Inspectors of Petroleum" published by the C. J. Tagliabue Manufacturing Company.

The odor characteristics of such waxes are determined in various ways. In general, either wax shavings or vapors from the wax are sniffed by a committee composed of a minimum of three persons. The wax is then rated by each committee man using a number system. The wax is rated on both odor type and intensity of the odor. The stability of a wax is generally determined by performing color and/or odor tests upon the wax before and after it has been subjected to extended storage periods at elevated temperatures. Several different tests are conventionally employed for this purpose.

The carbonizable matter content of a wax is conventionally determined in accordance with the U.S.P. test procedure for readily carbonizable substances. This test is described in detail in ASTM Test Procedure D–565. In general, the test consists of mixing a wax with concentrated sulfuric acid at a particular temperature and for a particular length of time and then comparing the color of the resulting acid layer from the test with a set of standard colors.

The U.S.P. acid test procedure for determining the amount of carbonizable substances in a hydrocarbon wax has limited accuracy and range. It is intended for use and is suitable only within the range of fully refined paraffin waxes, which contain relatively small amounts of carbonizable substances. A more flexible procedure applicable over a much wider range and therefore particularly useful in studying the effectiveness of treating processes has been developed. This procedure consists essentially of determining the absorption coefficient of a wax at a wave length of 330 millimicrons ($K_{330}$). This testing procedure has been carefully correlated with the results that are obtained with the U.S.P. acid procedure and it has been found that the new procedure is much more reliable and consistent. In view of this fact, the data in the present description which relate to improvement of this particular property of a wax by treating are expressed in terms of the reduction in the absorption coefficient at 330 millimicrons.

Having generally described the nature of the invention as well as the various tests that are employed in evaluating hydrocarbon waxes, attention is now directed toward a detailed discussion of the invention. In order to aid in this discussion, reference is made to the attached figure which illustrates diagrammatically a process flow plan of the manner in which the present treating step is preferably employed in a dewaxing and wax refining process.

Turning to the figure, it will be observed that a microwax petrolatum feed is heated in furnace 2 to a temperature of about 145° F. before being introduced into deasphalting tower 4 by means of line 3. In tower 4, the feed which has been introduced part way up the tower flows down through the tower and contacts a rising stream of solvent which enters the tower through line 5. As the solvent contacts the feed, the asphalt residue is dissolved out and is removed at the bottom of tower 4 by means of line 6. If desired, the asphalt residue may be heated in furnace 7, passed to stripper 9 by means of line 8 and stripped to recover the small amount of solvent which can be recycled to solvent accumulator 12 by means of line 10 and line 11.

The solvent phase containing the microwax petrolatum passes upwardly through the tower and is withdrawn through line 13. The solvent and deasphalted petrolatum is heated in furnace 14 to a temperature of about 250° F. and passed to stripper 16 by means of line 15 where the solvent is flashed off and recycled to solvent accumulator 12 for reuse. If desired, the deasphalted petrolatum may be heated further in a furnace (not shown) and stripped with steam in a stripper (not shown) to recover any remaining solvent.

In regard to the deasphalting step just explained, the solvent is preferably propane, although butane may be added to the propane if desired, with the only requirement being that the solvent be more than 50% propane. The amount of solvent to be added is in ratio with the wax of about 3–16 parts solvent to 1 part petrolatum.

In the present invention it is preferred in order to make a sizeable savings in propane, to deasphalt a microwax petrolatum feed which contains from 20 to 25 wt. percent oil. Such a feed may be obtained by controlling the oil content of the petrolatum in the dewaxing step or by recycling sufficient oil from the deoiling step to the deasphalting step to bring the oil content of the feed to the preferred range of 20 to 25 wt. percent. By providing a feed having this content oil, the amount of propane necessary for the deasphalting step can be reduced to from 3 to 5 parts propane to 1 part petrolatum. The temperature for the deasphalting step is in the range of about 140° to 170° F., preferably about 150° F.

Returning to stripper 16, the deasphalted petrolatum is withdrawn by line 17 and passed to deoiling zone 18. Upon entering the deoiling zone 18, the hydrofined wax is solvent deoiled in accordance with any one of several conventional procedures in order to reduce its oil content. Thus, the deasphalted petrolatum in line 17 may contain from about 10 to 50 wt. percent oil, while the products from deoiling zone 18 usually contain less than about 2.5 wt. percent oil and preferably less than 1.5 wt. percent oil.

It should be noted that deoiling may be performed after deasphalting, as shown above and in the drawing, or the deoiling step may be performed after hydrofining. The deoiling step is used to reduce the oil content of the wax to the required level and is not beneficial in the improvement of wax color and other quality factors or in maintaining the activity of the catalyst.

The wax leaves deoiling zone 18 by way of line 19 and is heated in furnace 20 and conducted to hydrofining zone 22 via line 21. Before entering zone 22, the wax is combined with hydrogen-containing gas from line 24 through line 25 and/or from line 26. Hydrofining zone 22 is illustrated as utilizing a downflow type operation, although upflow or combination of both may be used. When the wax possesses extraordinarily large amounts of sulfur, it is desirable to pass the wax downflow through the catalyst bed while passing the hydrogen-containing gas upwardly through the bed. This arrangement enables the gas phase to continuously scrub hydrogen sulfide and any other sulfur-containing gases from the treating zone before they enter into prolonged contact with the catalyst.

The wax is hydrofined at temperature, pressure and other operating conditions which will hereinafter be described. The hydrofined wax is withdrawn from hydrofining zone 22 by means of line 28, while lighter gases including hydrogen are withdrawn from zone 22 through line 23. Hydrogen-containing gas is recycled through line 24 in the conventional manner and fresh hydrogen may be added through line 27 when necessary.

The conditions in the hydrofining reactor are set forth in tabular form below:

HYDROFINING CONDITIONS

|  | Preferred | Range |
|---|---|---|
| Temperature, ° F | 600 | 400–700 |
| Pressure, p.s.i.g. | 600 | 400–3,000 |
| Feed Rate, v./hr./v | 0.5 | 0.5–2 |
| $H_2$ Feed, s.c.f./b. of Wax | 500 | 50–5,000 |

Having described the principal features of the present invention, attention is now directed toward the following examples which illustrate even further the advantages to be gained by the use of this invention.

Example 1

A dewaxed microwax petrolatum feed obtained from a lube oil fraction boiling from above 1000° F. and having the following inspection:

| | |
|---|---|
| Oil content, wt. percent | 15.7 |
| Color, Tag Robinson | ½ dilute |
| Conradson carbon residue | 1.02 |
| $K_{330}$ | 0.917 | was treated in the following manner. The dewaxed microwax petrolatum feed was first deoiled to an oil content of 1.83 wt. percent and then hydrofined using a catalyst comprising 3.6 wt. percent cobalt oxide and 12.5 wt. percent molybdenum oxide supported on an alumina base. The catalyst was in the shape of ⅛ inch extrudates. The hydrofining conditions were as follows:

| | |
|---|---|
| Temperature, °F | 600 |
| Pressure, p.s.i.g | 600 |
| Feed rate, v./hr./v | 0.5 |
| H₂ feed rate, s.c.f./b. of wax | 500 |

After only 40 hours of operation at these conditions, it was found that the Tag Robinson color of the product produced decreased from 15 during the first hour of operation to approximately 1 during the 40th hour. The decline was due to the deactivation of the catalyst.

*Example 2*

A dewaxed microwax petrolatum feed obtained in the same manner as in the first example was deoiled to an oil content of 1.83 wt. percent, and then deasphalted at a temperature of 145° F. with a propane-to-petrolatum ratio of 12.4 to 1. The deasphalted feed was then hydrofined using a cobalt molybdate catalyst of the same description and under the same conditions as in Example 1. The following is the result:

| | Deoiled Feed | Deasphalted Wax | Hydrofined Product | Deoiled Product |
|---|---|---|---|---|
| Color, Tag Robinson | 1 Dilute | 1½ | 9¼ | 10¼ |
| Conradson Carbon Residue | 0.67 | 0.28 | 0.13 | 0.07 |
| K₃₃₀ | 0.627 | .363 | .156 | 0.071 |
| Oil Content, Wt. Percent | 3.48 | 4.22 | 4.80 | 0.62 |

The above operation increased the Tag Robinson color to about 9. This operation was continued for about 180 hours. At the end of this time, a product inspection also showed a color improvement to approximately 9 Tag Robinson. This fact of no color improvement decrease during this period was due to the fact that catalyst deactivation had been prevented by the addition of the deasphalting step.

*Example 3*

A dewaxed microwax petrolatum feed containing 15.7 wt. percent oil and obtained in the same manner as in the two previous examples was deasphalted at a temperature of 145° F. with a propane-to-petrolatum ratio of 13 to 1. The deasphalted feed was then deoiled and then hydrofined, using a cobalt molybdate catalyst of the same description and under the same conditions as in the previous two examples. The following is the result.

| | Dewaxed Feed | Deasphalted Petrolatum | Deoiled Wax | Hydrofined Product |
|---|---|---|---|---|
| Color, Tag Robinson | ½ Dilute | 1¼ | 2 | 17¾ |
| Color Stability | | | | 17¾ |
| Conradson Carbon Residue | 1.02 | 0.6 | 0.22 | 0.06 |
| K₃₃₀ | 0.917 | | 0.21 | 0.066 |
| Oil Content, Wt. Percent | 15.7 | 16.0 | 1.06 | 1.30 |
| Odor | | | | 4 |
| Odor Stability | | | | 4 |

This operation was continued for 180 hours and a color of about 17 Tag Robinson was obtained at the end of the 180 hours using the same catalyst. By deasphalting a microwax having an oil content of 16%, a wax product of superior quality was obtained with no catalyst deactivation for a period of 180 hours.

*Example 4*

A dewaxed microwax petrolatum feed containing 26.7 wt. percent oil and obtained in the same manner as in the previous examples was deasphalted at a temperature of 145° F. with a propane to petrolatum ratio of 12 to 1. The deasphalted feed was then hydrofined using a cobalt molybdate catalyst of the same description and under the same conditions as in the previous examples. After hydrofining, the petrolatum was deoiled. The following are the results:

| | Dewaxed Feed | Deasphalted Petrolatum | Hydrofined Product | Deoiled Product |
|---|---|---|---|---|
| Color, Tag Robinson | ¼ Dilute | ¾ | 9¾ | 17¾ |
| Conradson Carbon Residue | 2.29 | 0.59 | 0.22 | 0.02 |
| K₃₃₀ | 1.557 | 0.548 | .180 | .043 |
| Oil Content, Wt. Percent | 26.7 | 26.6 | 26.8 | 0.46 |

This operation was also continued for over 180 hours and no catalyst deactivation was observed. It is apparent from Examples 3 and 4 that a superior product may be obtained without catalyst deactivation by either deoiling before hydrofining or after.

*Example 5*

A dewaxed microwax petrolatum having an oil content as shown was deasphalted in a deasphalting tower under the following conditions with these results:

| Petrolatum Feed | A | B | C | D | E | E | E | E |
|---|---|---|---|---|---|---|---|---|
| Oil Content Wt. Percent (Plus Added Oil) | 0.5 | 1.8 | 23.1 | 4.9 | 15.7 | 15.7 | 15.7 | 15.7 |
| Oil Added, Wt. Percent | None | 1 | 20 | 45 | None | None | None | None |
| Ratio Propane/Petrolatum | 12/1 | 8/1 | 5/1 | 3/1 | 13/1 | 13/1 | 10/1 | 13/1 |
| Temperature, °F | 175 | 170 | 170 | 150 | 140 | 145 | 145 | 150 |
| Yield, Vol. Percent (Before Deoiling) | None | 26 | 75 | 89 | ¹ 100 | 96 | 84 | 69 |
| Yield, Vol. Percent (After Deoiling) | None | 25.8 | 58 | 45 | -------- | 48 | 42 | -------- |

¹ No phase separation was obtained and everything came off the top of the deasphalting tower.

From this example, it can be seen that it is necessary to deasphalt the dewaxed microwax petrolatum at a temperature between 140 to 170° F., preferably about 150° F. From the data concerning deasphalting of feed C, it should be noted that it is preferable to deasphalt a petrolatum feed which contains from 20 to 25 wt. percent oil since only from 3 to 5 parts solvent to 1 part petrolatum is required instead of from 7 to 13 parts solvent as is required when treating a feed having an oil content of less than 20 wt. percent. When the oil content is increased as high as 4.9 wt. percent as shown in the deasphalting of feed D, the yield is satisfactory but the yield after deoiling, although sufficient, is not as satisfactory as the yield obtained by deasphalting feed C which has an oil content within the preferred range.

From the five examples, several facts are apparent. First, in order to prevent catalyst deactivation, it is necessary to deasphalt the wax feed. Second, in order to improve color to a superior level, it is necessary not only to deasphalt the wax feed before hydrofining but to deasphalt a wax feed containing from about 10 to 50 wt. percent oil. Third, if an oil containing wax feed is first deasphalted, then the deoiling step can be either before or after hydrofined. Fourth, it is necessary to deasphalt the wax feed at a temperature between 140° and 170° F. with a solvent to wax ratio of from 3 to 13 parts solvent to 1 part petroleum.

What is claimed is:

1. A method of refining a high molecular weight microcrystalline wax which comprises combining a dewaxed microcrystalline petrolatum containing from about 10 to 50 wt. percent oil with a deasphalting solvent in the ratio of about 3 to 13 parts solvent to 1 part petrolatum at a temperature in the range of about 140 to 170° F., separating the petrolatum and solvent, passing the petrolatum in admixture with hydrogen containing gas over a cobalt molybdate catalyst on an adsorbent carrier at temperatures in the range of about 400 to 700° F. and pressures of about 400 to 1000 p.s.i.g., and thereafter deoiling the petrolatum to an oil content of less than 2.5 wt. percent.

2. The method of claim 1 in which the deasphalting solvent is propane.

3. The method of claim 1 in which the deasphalting solvent is a mixture of a major proportion of propane and a minor proportion of butane.

4. The method of claim 1 in which the catalyst contains 2 to 5 wt. percent cobalt oxide and 8 to 15 wt. percent molybdenum oxide supported on an alumina carrier.

5. A method of refining a high molecular weight microcrystalline wax which comprises combining a dewaxed microcrystalline petrolatum containing from about 10 to 50 wt. percent oil with a deasphalting solvent in the ratio of about 3 to 13 parts solvent to 1 part petrolatum at a temperature in the range of about 140 to 170° F., separating the wax and solvent, deoiling the petrolatum to an oil content less than 2.5 wt. percent, and passing the deoiled petrolatum in admixture with hydrogen containing gas over a cobalt molybdate catalyst on an adsorbent carrier at temperatures in the range of about 400 to 700° F. and pressures of about 400 to 1000 p.s.i.g.

6. The method of claim 5 in which the deasphalting solvent is propane.

7. The method of claim 5 in which the deasphalting solvent is a mixture of a major proportion of propane and a minor proportion of butane.

8. The method of claim 5 in which the catalyst contains 2 to 5 wt. percent cobalt oxide and 8 to 15 wt. percent molybdenum oxide supported on an alumina carrier.

9. A method of refining a high molecular weight microcrystalline wax which comprises combining a dewaxed microcrystalline petrolatum containing from about 20 to 25 wt. percent oil with a deasphalting solvent in the ratio of about 3 to 5 parts solvent to 1 part petrolatum at a temperature in the range of about 140 to 170° F., separating the petrolatum and solvent, passing the petrolatum in admixture with hydrogen containing gas over a cobalt molybdate catalyst on an adsorbent carrier at temperatures in the range of about 400 to 700° F. and pressures of about 400 to 1000 p.s.i.g, and thereafter deoiling the petrolatum to an oil content of less than 2.5 wt. percent.

10. The method of claim 9 in which the deasphalting solvent is propane.

11. The method of claim 9 in which the catalyst contains 2 to 5 wt. percent cobalt oxide and 8 to 15 wt. percent molybdenum oxide supported on an alumina carrier.

12. A method of refining a high molecular weight microcrystalline wax which comprises combining a dewaxed microcrystalline petrolatum containing from about 20 to 25 wt. percent oil with a deasphalting solvent in the ratio of about 3 to 5 parts solvent to 1 part petrolatum at a temperature in the range of about 140 to 170° F., separating the wax and solvent, deoiling the petrolatum to an oil content less than 2.5 wt. percent, and passing the deoiled petrolatum in admixture with hydrogen containing gas over a cobalt molybdate catalyst on an adsorbent carried at temperatures in the range of about 400 to 700° F. and pressures of about 400 to 1000 p.s.i.g.

13. The method of claim 12 in which the deasphalting solvent is propane.

14. The method of claim 12 in which the catalyst contains 2 to 5 wt. percent cobalt oxide and 8 to 15 wt. percent molybdenum oxide supported on an alumina carrier.

References Cited in the file of this patent

UNITED STATES PATENTS

| | | |
|---|---|---|
| 2,606,141 | Meyer | Aug. 5, 1952 |
| 2,658,856 | Perry et al. | Nov. 10, 1953 |
| 2,682,523 | Talley | June 29, 1954 |

FOREIGN PATENTS

| | | |
|---|---|---|
| 791,013 | Great Britain | Feb. 19, 1958 |
| 797,744 | Great Britain | July 9, 1958 |